June 26, 1945.  A. ETESSAM ET AL  2,379,344
INTERNAL-COMBUSTION ENGINE AND ROTARY VALVE THEREFOR
Filed June 23, 1943  3 Sheets-Sheet 1

INVENTORS.
Abdoth Etessam.
George A. Davies.
By Henry J. Lucke
ATTORNEY

June 26, 1945. A. ETESSAM ET AL 2,379,344
INTERNAL-COMBUSTION ENGINE AND ROTARY VALVE THEREFOR
Filed June 23, 1943 3 Sheets-Sheet 2

INVENTORS,
Abayeh Etessam
George A. Davies
BY Henry J. Luckl
ATTORNEY.

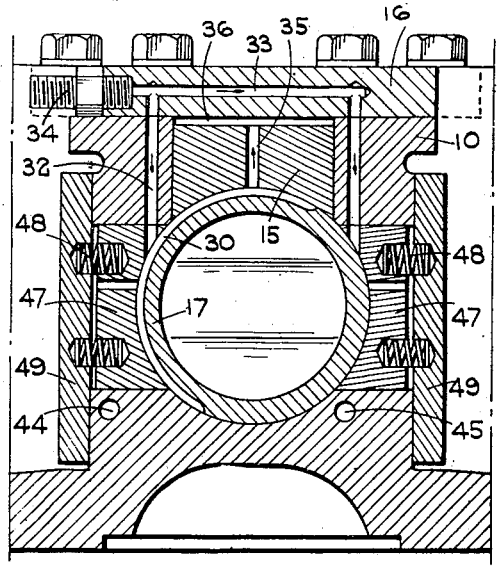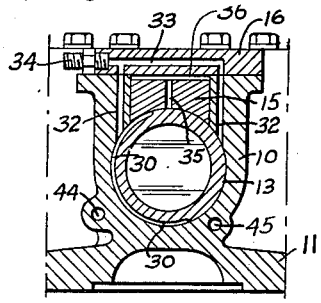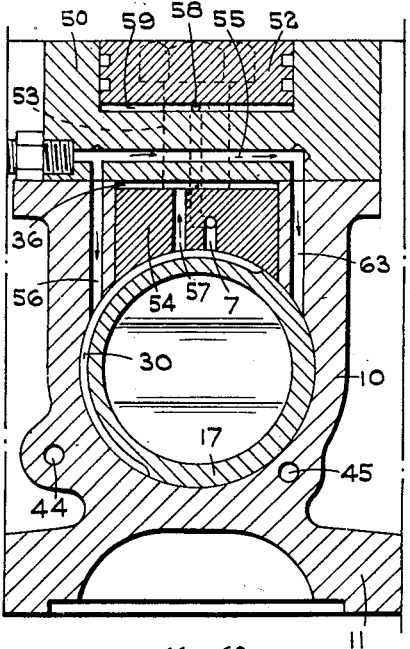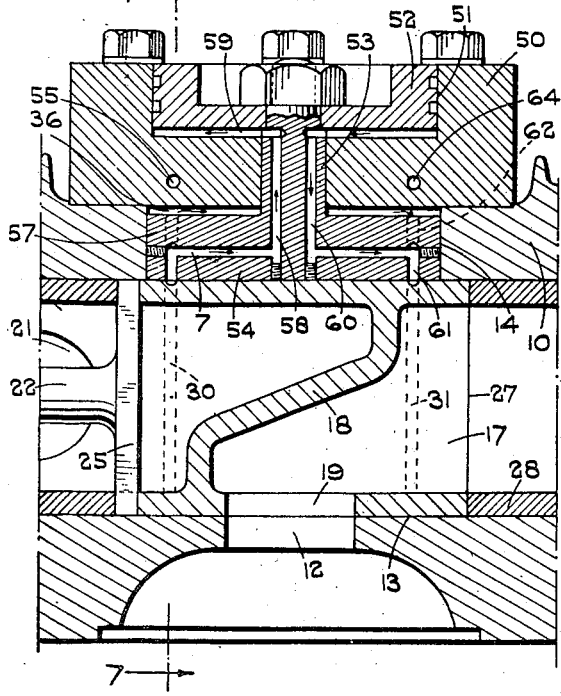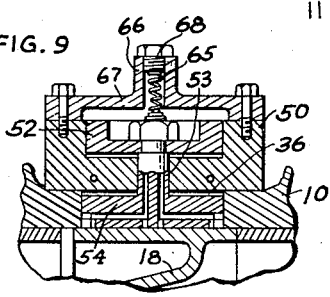

Patented June 26, 1945

2,379,344

UNITED STATES PATENT OFFICE 2,379,344

INTERNAL-COMBUSTION ENGINE AND ROTARY VALVE THEREFOR

Abdolh Etessam, Wylde Green, Sutton Coldfield, and George Alexander Davies, Olton, Birmingham, England, assignors to Etessam Rotary Valve Company Limited, Birmingham, England, a British company Application June 23, 1943, Serial No. 491,904
In Great Britain July 21, 1942

5 Claims. (Cl. 123—80)

This invention relates to engines having a rotary sleeve valve or valves held in contact with its seating through the medium of a column of liquid under pressure, a device being provided for isolating the source of pressure from the pressure applying means at appropriate times in the cycle of combustion operations so that the cylinder gas pressure acting on the valve is carried by the isolated column of liquid during predetermined periods when the said gas pressure is comparatively high.

The present invention consists in an improved method of and means for so isolating the source of pressure.

According to the present invention we provide rotary valve gear of the kind referred to for internal combustion engines, wherein the device for isolating the source of pressure from the pressure applying means comprises interrupted circumferential passages extending partly around the valve periphery, through which passages, pressure liquid from the source of pressure passes to the cylinder piston, the flow of pressure liquid to the piston being interrupted periodically by the rotation of the valve.

The liquid used is preferably oil as there is usually a supply of oil under pressure provided by the lubricating oil pump of the engine. It is not necessary to increase the oil pressure with the engine speed. The engine oil pump is usually provided with a relief valve which tends to keep the pressure reasonably constant, and the oil pressure employed is high enough to maintain a reasonable flow.

The flow of pressure liquid to the piston may, for instance, be interrupted for a part of each revolution of the valve by the ungrooved part of the valve surface, temporarily closing the ends of the pressure liquid inlet passage in the valve casing.

The improved rotary valve gear may comprise a rotary hollow valve operating in a valve casing having a port leading to the engine cylinder, a port in the valve adapted to co-operate with the port in the casing, interrupted peripheral grooves in the circumference of the valve one on each side of the port, a cylinder formed in the valve casing on the opposite side of the valve from that where the casing port is provided, a piston in this cylinder, one or more inlet passages through the valve casing leading to the periphery of the valve and in register with one of the interrupted grooves thereof, one or more outlet passages in the valve casing in register with the other valve groove, and passages through the piston, the ends of which register with the grooves in the valve so that the pressure liquid can circulate periodically through the space in the end of the cylinder behind the piston, such circulation being interrupted when the valve groove or one of them moves away from the inlet or outlet passage.

An opening may be provided in the valve casing in a suitable position in which a spring pressed scraper bar is situated engaging the periphery of the valve longitudinally for the purpose of removing excess pressure liquid and diverting it into a passage through the valve casing from which it may be conveyed back to the liquid circulating system.

The valve casing may be provided with pressure blocks engaging opposite sides of the valve between the part engaged by the piston and the part adjacent the port leading to the cylinder, these pressure blocks being for the purpose of reducing leakage of the pressure liquid between the grooves in the valve and the valve seat.

Instead of using a single piston adapted to press the valve towards the engine cylinder, two pistons connected by a neck may be used, these pistons operating in separate cylinders and both being acted upon in opposite directions by the pressure liquid. With this arrangement only a light pressure acts upon the rotary valve except at such times as when the pressure in the engine cylinder is high when the isolation of the pressure liquid acting on the pistons operates to tend to keep the valve against the ported part of the valve casing.

Referring to the drawings—

Figure 5 is a sectional end view showing a modification.

Figure 6 is a sectional view in side elevation showing another construction.

Figure 7 is a sectional view on line 7—7 of Figure 6.

Figure 8 is a view similar to Figure 4 but on a smaller scale and showing the valve in a position in which passage of the pressure fluid through the ducts 32 and 35 is interrupted.

Figure 9 is a sectional view showing how a spring can be employed for providing normal downward pressure upon the double piston member 52, 54.

Figure 1:
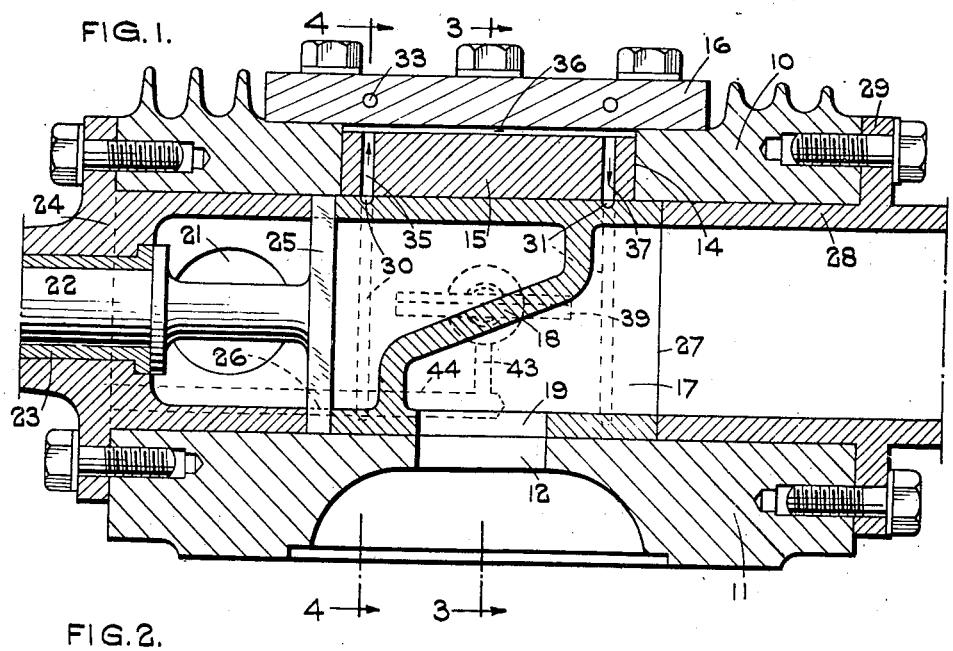
Figure 1 is a sectional view in side elevation showing one construction.
Figure 2:
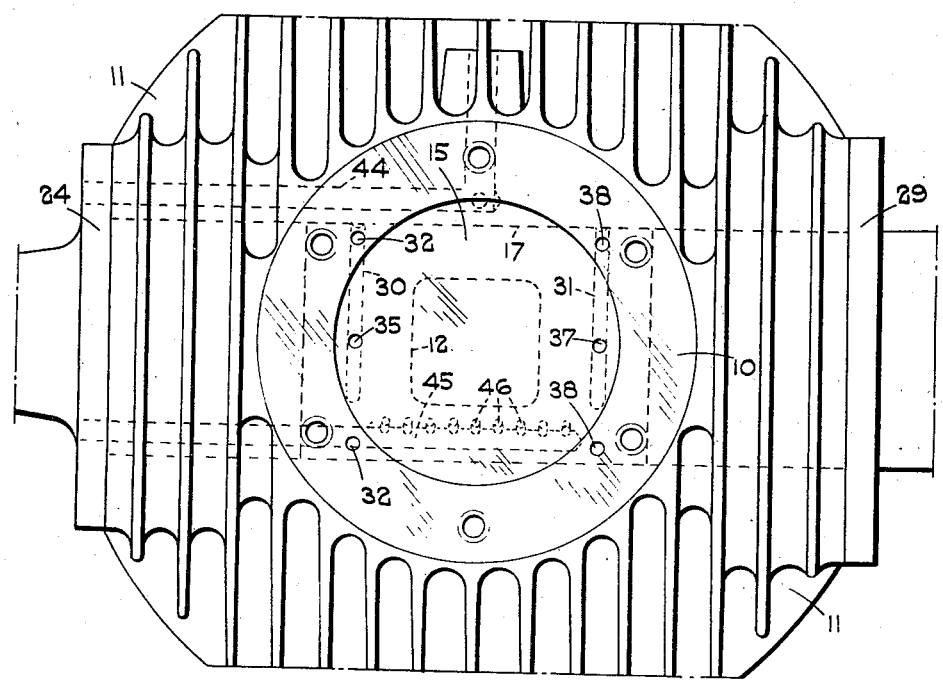
Figure 2 is a plan view.
Figure 3:
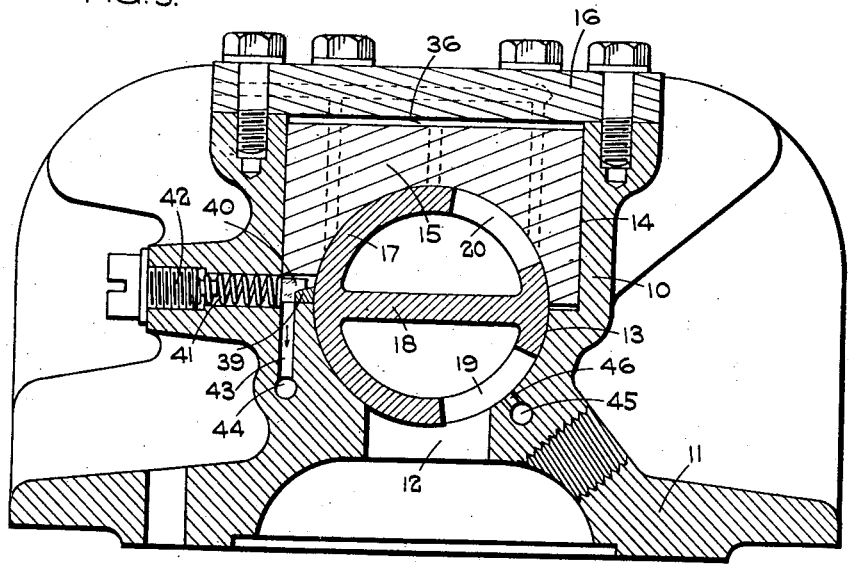
Figure 3 is a sectional view on line 3—3 of Figure 1.
Figure 4:
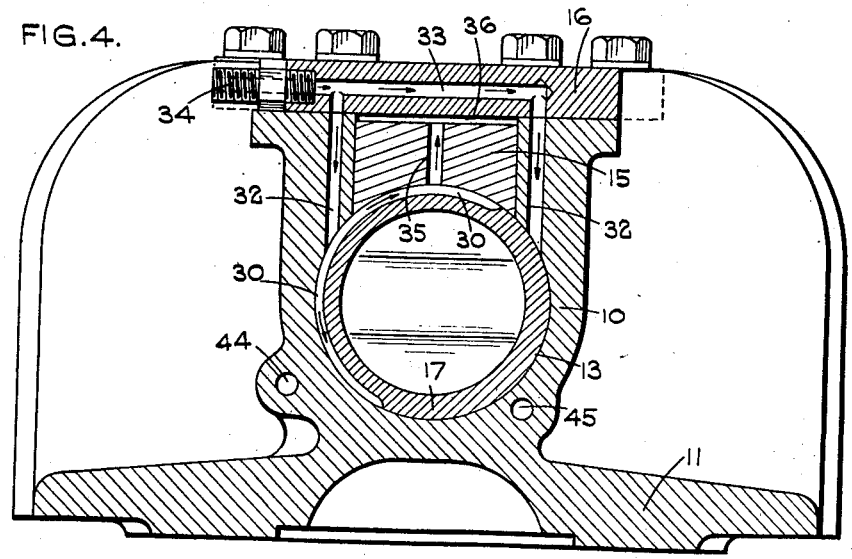
Figure 4 is a sectional view on line 4—4 of Figure 1.

In the construction shown in Figures 1 to 4, the valve casing is shown at 10 and is provided with a flange 11 for bolting to the cylinder head. The valve casing is provided with a port 12 leading to the engine cylinder and with a part cylindrical valve seat 13.

Above the valve seat, the valve casing is formed as a cylinder 14 which receives the pressure piston 15, the upper end of the cylinder being closed by a cover 16.

The valve 17 is of hollow cylindrical form as shown and is provided with a transverse inclined partition 18 and with two ports 19, 20 so that the valve can serve both as an inlet valve and an exhaust valve.

The valve seating is provided with an inlet port 21 and the valve is adapted to be driven by a shaft 22 rotating in a bearing 23 fixed in a hollow body 24 secured to the end of the valve casing.

The shaft 22 is provided with a cross piece 25, the ends of which engage in notches 26 formed in one end of the cylinder forming the valve.

The opposite end 27 of the valve abuts against a tubular body 28 having a flange 29 secured to the end of the valve casing.

The valve 17 is provided with two interrupted circumferential grooves 30, 31 and the valve casing is provided with a pair of inlet passages 32 for the passage of pressure liquid from an inlet passage 33 having a connection 34 to the pressure lubrication system or other source of pressure liquid.

The inlet passages 32 are arranged somewhat tangential and lead the pressure liquid to the passage 30, the liquid passing around the passage 30 and then upwardly through a passage 35 in the piston 15 to a space 36 between the end of the piston and the underside of the cover 16.

The passage 33 leading to the passages 32 is formed in the cover 16.

Similar passages are provided in the valve casing and in the cover 16 co-operating with the interrupted groove 31 and the pressure liquid flows into the passage 33 and down the passages 32 around the groove 30 when it is in the appropriate position, up the passage 35 to the space 36, then across this space 36 to the other passage 37 in the piston, down that passage to the other groove 31, and around this groove when it is in the appropriate position to the passages 38 in the valve casing which correspond with the passages 32. The passages 38 communicate at the top with a further passage in the cover 16 which is similar to the passage 33 and leads to a connection similar to 34 and thence back to the pressure fluid circuit.

The valve casing may further be provided with a scraper bar 39 having a piece 40 upon which acts a compression spring 41 abutting against the screwed plug 42, the scraper 49 thus being pressed against the surface of the valve at a position between the piston and the port 12, the scraper bar removing any excess of pressure fluid from the surface of the valve and transferring it to the passage 43 and thence to the passage 44 to an outlet which may extend through the flange of the part 24 and thence back to the pressure fluid circuit.

A lubrication passage 45 may be provided communicating by a series of ports 46 with the valve seat for lubricating the valve.

The construction shown in Figure 5 is similar as regards the ports and passages for the pressure fluid, but instead of using a scraper bar such as 39, those parts of the valve between the piston and the port 12 are kept oil-tight by two sets of pressure blocks 47 placed in openings in the sides of the valve casing and acted upon by springs 48 abutting against covers 49.

One set of the blocks 47 co-operates with the grooves 30, the blocks being a little wider than the grooves and another set co-operates with the grooves 31.

In the construction shown in Figures 6 and 7, the cover 50 for the cylinder 14 is formed on the upper side as a second cylinder 51 in which is a second piston 52 connected by a neck 53 with the piston 54 which works in the cylinder 14.

In this arrangement the grooves 30 and 31 in the valve are arranged as before.

The cover 50 is provided with an inlet passage 55 for the pressure fluid and this communicates with an inlet passage 56 in the valve casing co-operating with the groove 30 and the pressure fluid can pass around the groove 30 through a passage 57 in the piston 54 to the space 36 between the top of the piston and the end of the cylinder in which it works. Further the pressure fluid can pass through a passage 7 in the piston 54 to a passage 58 leading to a space 59 between the underside of the piston 52 and the bottom of the cylinder in which it works.

A further passage 60 is provided leading from the space 59 through the neck 53 to a passage 61 communicating with the groove 31. In addition there is a passage 62 leading from the space 36 to the groove 31. From the groove 31 the liquid passes upwardly through passages similar to 56 and 63 in the valve casing to a passage 64 in the cover 50 and thence back to the pressure fluid circuit.

The spaces 36 and 59 are preferably only a few thousandths of an inch in depth so that pressure waves are avoided.

The two pistons 52 and 54 may be of the same size in which case the pressure on the two pistons will be exactly balanced and in such an arrangement a spring 65 may be used for providing the normal downward pressure on the valve. The spring 65 is placed in a tubular part 66 of a plate 67 secured to the cover plate 50. One end of the spring 65 bears upon a screw 68, and the other end bears on the end of the stem 53 connecting the two pistons. Alternatively the piston 52 may be of rather less diameter than the piston 54 so that a resultant downward pressure will be received from the pressure fluid.

During the time that the pressure liquid is flowing through the system a relatively light pressure will bear upon the valve but when the flow of pressure fluid is interrupted by the grooves 30 and 31 moving out of register with the passages, the pressure in the engine cylinder at such times being high, there will be a tendency to lift both pistons with the result that the pressure in the space 59 will be reduced and the pressure in the space 36 will become very high, thus keeping the valve tight on the valve seating.

What we claim then is:

1. In an internal combustion engine having a rotary sleeve valve, a seating for said valve, means for holding the valve on its seating through the medium of liquid under pressure, means for isolating the source of pressure of said liquid at appropriate times in the cycle of combustion operations so that the cylinder gas pressure acting on the valve is carried by said liquid when isolated from its source of pressure during predetermined periods when the cylinder gas pressure is high, said isolating means comprising interrupted circumferential grooves in the periphery of said valve, a valve casing having an auxiliary cylinder on the side of the valve opposite to that where the engine power cylinder is situated, and a sealing piston in said auxiliary cylinder acting on said valve, said valve casing and said piston having passages for the pressure liquid, said passages co-operating with said grooves, the portions of the valve between the ends of said grooves interrupting the flow of pressure liquid to said auxiliary cylinder periodically by the rotation of said valve.

2. In an internal combustion engine, an engine cylinder, a valve casing adjacent said cylinder, said valve casing having a port communicating with said engine cylinder, a rotary hollow valve in said seating, the valve having a port co-operating with the port in the valve casing, said valve having spaced interrupted circumferential grooves in its periphery, one on each side of said valve port, said valve casing having an auxiliary cylinder on the opposite side to that where the power cylinder is situated, and a sealing piston in this cylinder, said valve casing having an inlet passage for pressure liquid, said inlet passage leading to one of the grooves in the valve, said valve casing having an outlet passage for pressure liquid leading from the other valve groove, said sealing piston having inlet and outlet passages extending through it one registering with each of the grooves in the valve, so that the pressure liquid can circulate through said passages and the space between the end of the sealing piston and the adjacent end of the auxiliary cylinder in which it works, except when interrupted by the portions of the valve between the ends of the grooves.

3. Apparatus according to claim 2 having said valve seat formed with openings at opposite sides of the valve, and between the engine cylinder port and the sealing piston, pressure blocks in said openings, springs acting on said pressure blocks and pressing them into contact with opposite sides of that part of the valve which is disposed between the grooves.

4. In an internal combustion engine, an engine cylinder, a valve casing adjacent said cylinder, said valve casing having a port communicating with said engine cylinder, a rotary hollow valve in said seating, the valve having a port co-operating with the port in the valve casing, said valve having spaced interrupted circumferential grooves in its periphery, one on each side of said valve port, said valve casing having an auxiliary cylinder on the opposite side to that where the power cylinder is situated, and a sealing piston in this auxiliary cylinder, and a cover closing the end of said auxiliary cylinder, said valve casing having an inlet passage for pressure liquid, said inlet passage leading to one of the grooves in the valve, said cover having an inlet passage for pressure liquid communicating with the inlet passage in the valve casing, said valve casing having an outlet passage for pressure liquid leading from the other valve groove, said cover having an outlet passage for pressure liquid communicating with the outlet passage in the valve casing, said sealing piston having inlet and outlet passages extending through it, one registering with each of the grooves in the valve, so that the pressure liquid can circulate through said passages and the space between the end of the sealing piston and the cover except when interrupted by the portions of the valve between the ends of the grooves.

5. In an internal combustion engine, a power cylinder, a valve casing adjacent said power cylinder, said valve casing having a port communicating with said power cylinder, a rotary hollow valve in said seating, the valve having a port co-operating with the port in the valve casing, said valve having spaced interrupted circumferential grooves in its periphery, one on each side of said valve port, said valve casing having an auxiliary cylinder on the opposite side to that where the power cylinder is situated, and a sealing piston in this cylinder, and a cover closing the end of said auxiliary cylinder, a balancing piston cylinder formed in said cover, a balancing piston in said balancing cylinder, means extending through an opening in said cover connecting said balancing and sealing pistons together, said valve casing having an inlet passage for pressure liquid, said inlet passage leading to one of the grooves in the valve, said cover having an inlet passage for pressure liquid communicating with the inlet passage in the valve casing, said valve casing having an outlet passage for pressure liquid leading from the other valve groove, said cover having an outlet passage for pressure liquid communicating with the outlet passage in the valve casing, said sealing piston having inlet and outlet passages extending through it, one registering with each of the grooves in the valve, so that the pressure liquid can circulate through said passages and the space between the end of the sealing piston and the cover, except when interrupted by the portions of the valve between the ends of the grooves, said sealing piston having further passages extending through it and through said connecting means so that the pressure liquid can circulate in a space between the end of the balancing piston cylinder and the balancing piston therein.

ABDOLH ETESSAM.
GEORGE ALEXANDER DAVIES.